United States Patent
Albrecht et al.

(10) Patent No.: US 7,317,596 B2
(45) Date of Patent: Jan. 8, 2008

(54) MAGNETIC RECORDING DISK DRIVE HAVING READ HEAD WITH HIGH CROSS-TRACK RESOLUTION AND DISK WITH LOW BIT-ASPECT-RATIO

(75) Inventors: Thomas R. Albrecht, San Jose, CA (US); Robert E. Fontana, Jr., San Jose, CA (US); Ching Hwa Tsang, Sunnyvale, CA (US); Mason L. Williams, San Jose, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 337 days.

(21) Appl. No.: 11/158,444

(22) Filed: Jun. 21, 2005

(65) Prior Publication Data

US 2006/0285257 A1 Dec. 21, 2006

(51) Int. Cl.
G11B 5/39 (2006.01)
(52) U.S. Cl. ............... 360/319; 360/234.8; 360/236.7; 360/235.9
(58) Field of Classification Search ................ 360/313, 360/317, 320, 324–324.2, 234.7, 234.8, 236.7, 360/235.9, 319
See application file for complete search history.

(56) References Cited

U.S. PATENT DOCUMENTS

| | | | |
|---|---|---|---|
| 4,652,945 A * | 3/1987 | Marchant ................ 360/77.01 |
| 4,924,334 A | 5/1990 | Diepers et al. |
| 4,954,920 A * | 9/1990 | Yamada et al. ............ 360/315 |
| 5,777,824 A | 7/1998 | Gray |
| 5,825,593 A | 10/1998 | Mowry |
| 6,014,296 A * | 1/2000 | Ichihara et al. ............ 360/135 |
| 6,073,338 A | 6/2000 | Liu et al. |
| 6,169,645 B1 * | 1/2001 | Lee ............................ 360/313 |

(Continued)

FOREIGN PATENT DOCUMENTS

JP  62121917 A2  6/1987

(Continued)

OTHER PUBLICATIONS

"Longitudinal Read Sensor for Magnetic Disks," Aug. 1, 1990, IBM Technical Disclosure Bulletin, vol. No. 33, Iss No. 3B, pp. 209-211.*

(Continued)

Primary Examiner—William J Klimowicz
(74) Attorney, Agent, or Firm—Thomas R. Berthold (57) ABSTRACT

A continuous-media or patterned-media disk drive with a low ratio of linear bit density in bits per inch (BPI) in the along-the-track direction to track density in tracks per inch (TPI) in the cross-track direction has a magnetoresistive read head with high cross-track spatial resolution. The read head is located between two magnetic shields, with the shields and read head formed on a side surface of the head carrier perpendicular to the carrier's disk-facing surface. The carrier is supported by the disk drive actuator with the side surface of the carrier oriented generally parallel to the data tracks. In this arrangement the high-spatial-resolution direction of the read head (the transverse direction perpendicular to the side surface on which the head is formed) is in the radial or cross-track direction.

20 Claims, 9 Drawing Sheets

U.S. PATENT DOCUMENTS

| | | | |
|---|---|---|---|
| 6,256,171 B1 * | 7/2001 | Yoda et al. | 360/235.3 |
| 6,369,992 B1 * | 4/2002 | Yoda et al. | 360/321 |
| 6,459,552 B1 | 10/2002 | Liu et al. | |
| 6,477,018 B1 * | 11/2002 | Terunuma | 360/317 |
| 6,504,796 B1 | 1/2003 | Sakakima et al. | |
| 6,621,664 B1 * | 9/2003 | Trindade et al. | 360/318 |
| 2001/0022712 A1 * | 9/2001 | Funayama et al. | 360/317 |
| 2002/0057538 A1 * | 5/2002 | Trindade et al. | 360/319 |
| 2003/0214761 A1 * | 11/2003 | Freitag et al. | 360/322 |
| 2004/0047080 A1 * | 3/2004 | Sakakima et al. | 360/318 |
| 2004/0156148 A1 | 8/2004 | Chang et al. | |
| 2005/0174700 A1 * | 8/2005 | Hiramoto et al. | 360/321 |
| 2006/0114617 A1 * | 6/2006 | Nikitin | 360/324.1 |

FOREIGN PATENT DOCUMENTS

| | | | | |
|---|---|---|---|---|
| JP | 62172515 | A2 | | 7/1987 |
| JP | 62270015 | A2 | | 11/1987 |
| JP | 63091817 | A | * | 4/1988 |
| JP | 63224016 | A2 | | 9/1988 |
| JP | 01279414 | A | * | 11/1989 |
| JP | 02236812 | A2 | | 9/1990 |
| JP | 02257411 | A2 | | 10/1990 |
| JP | 08167132 | A | * | 6/1996 |
| JP | 08221718 | A | * | 8/1996 |
| JP | 11250424 | A | * | 9/1999 |

OTHER PUBLICATIONS

Kanai et al., "Super Narrow Track MR Head", IEEE Trans. Mag., vol. 11, Sep. 1975, pp. 1212-1214.

Tang et al., "A Design Concept of Array Heads", IEEE Trans. Mag., vol. 33, May 1997, pp. 2397-2401.

* cited by examiner

MAGNETIC RECORDING DISK DRIVE HAVING READ HEAD WITH HIGH CROSS-TRACK RESOLUTION AND DISK WITH LOW BIT-ASPECT-RATIO

BACKGROUND OF THE INVENTION

1. Field of the Invention

This invention relates generally to magnetic recording disk drives, and more particularly to ultrahigh data density disk drives.

2. Description of the Related Art

Conventional magnetic recording disk drives use "continuous media" disks with a recording layer of a continuous magnetic film. Data is recorded or written in the continuous film in concentric data tracks when regions of the film are magnetized in the circumferential or along-the-track direction by an inductive write head, resulting in written data "bits". Disk drives have been proposed that use "patterned media" disks with a recording layer that is patterned into concentric data tracks, with each track having discrete magnetic islands or "bits" separated by nonmagnetic regions. Data is written in the discrete islands in the previously patterned data tracks by an inductive write head that magnetizes the magnetic material in the islands, resulting in the written data "bits".

In either type of disk drive, the written data bits are read back when the magnetic fields from the bits are detected by a magnetoresistive read head and processed by the disk drive's circuitry into data as the disk rotates past the read head. The read head is a stack of thin films formed between two shields on a planar surface of a head carrier, with the planar surface being oriented perpendicular to the disk and parallel to the cross-track or radial direction. The shields sharpen the spatial response of the read head in the down-track direction, improving the down-track resolution. The spatial response in the cross-track direction is largely determined by the lithographically determined width of certain layers of the read head's thin film stack. The conventional read head has an inherent asymmetric spatial resolution, meaning a high spatial resolution in the transverse direction perpendicular to the planar surface (the along-the-track or circumferential direction) and a lower spatial resolution in the direction parallel to the planar surface (the cross-track or radial direction).

The need for disk drives with ever increasing data density requires that the data bits be packed closer together on the disk. The ratio of linear bit density in bits per inch (BPI) in the along-the-track direction to the track density in tracks per inch (TPI) in the cross-track direction is called the bit aspect ratio (BAR). Because of the inherent asymmetry of the conventional read head, and the challenges of implementing suitable track-following servo systems to handle very narrow tracks, the BAR of conventional disk drives has typically been larger than 5.

To achieve ultrahigh data density, e.g., on the order of 300 Gbits/in$^2$ and above, further increases in BPI are made more difficult because the requisite scaling down of media grain size can result in a thermally unstable recording medium. Therefore, further increases in density with conventional media are likely to be accomplished primarily by increasing TPI, which results in decreasing BAR. Disk drives using patterned media are likely to have BAR values near 1, due to lithographic patterning challenges that make media fabrication considerably more difficult at BAR values larger than approximately 2.

What is needed is an ultrahigh data density magnetic recording disk drive with a read head that can detect bits packed on the disk with a low BAR.

SUMMARY OF THE INVENTION

The invention is a continuous-media or patterned-media disk drive with a low BAR and having a magnetoresistive read head with high cross-track spatial resolution. The read head is located between two magnetic shields, with the shields and read head formed on a side surface of the head carrier perpendicular to the carrier's disk-facing surface. The carrier is supported by the disk drive actuator with the side surface of the carrier oriented generally parallel to the data tracks. In this arrangement the high-spatial-resolution direction of the read head (the transverse direction perpendicular to the side surface on which the head is formed) is in the radial or cross-track direction. When the read head is detecting data bits from a data track the shields on either side of the head reduce the amount of flux from data bits in the neighboring data tracks.

The read head with high cross-track spatial resolution is optimal for detecting data bits from a disk with a BAR less than about 3. This permits the use of ultrahigh density patterned media with bits patterned to achieve a BAR on the order of 1. With a conventionally oriented head, use of patterned media (with its low BAR) would require an unusually narrow read element, since the reader width typically needs to be roughly half the track pitch to achieve sufficient adjacent track rejection. This invention allows a significantly wider read head width, since good adjacent track rejection is an inherent capability of heads oriented parallel to the track, and does not have a strong dependence on the width of the read head. Because the fabrication of narrow read heads is challenging from a lithographic patterning standpoint, heads made according to this invention are easier to fabricate.

The read head may be a current-in-the plane (CIP) or a current-perpendicular-to-the-plane (CPP) giant magnetoresistance (GMR) read head that has free and pinned ferromagnetic layers separated by an electrically-conductive nonmagnetic spacer layer, or a magnetic tunnel junction (MTJ) magnetoresistive read head that has free and pinned ferromagnetic layers separated by an electrically-insulating tunnel barrier.

The magnetic recording disks may be "horizontal" recording disks in which the data bits are magnetized in the plane of the recording layer, or "perpendicular" recording disks in which the data bits are magnetized perpendicular to the plane of the recording layer.

The disk drive may have the inductive write head also formed on the same side surface of the head carrier as the read head, with generally coplanar pole tips parallel to the side surface. When used with continuous media the thickness of the coplanar pole tips on the side surface generally defines the width of the data tracks.

For a fuller understanding of the nature and advantages of the present invention, reference should be made to the following detailed description taken together with the accompanying figures.

DETAILED DESCRIPTION OF THE INVENTION

Prior Art

Figure 1:
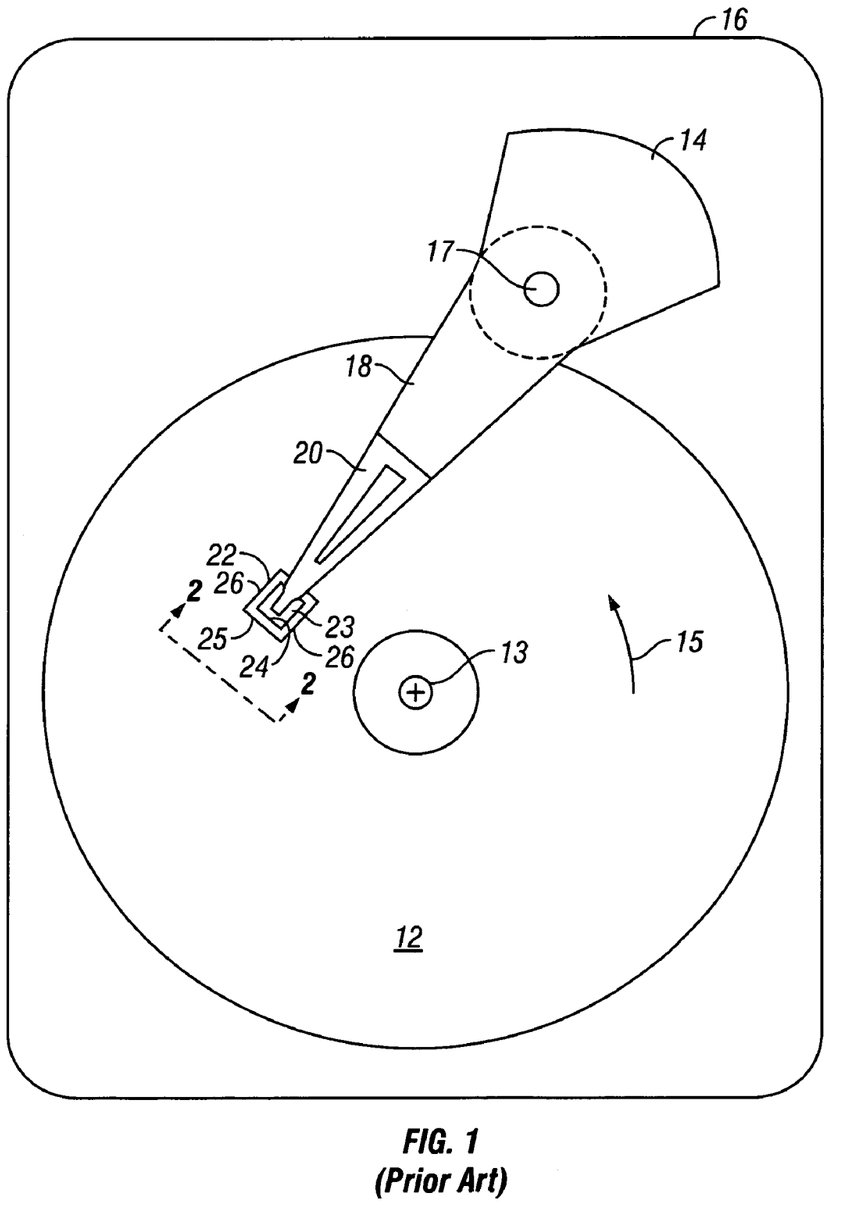
FIG. 1 is a schematic top view of a conventional magnetic recording hard disk drive according to the prior art with the cover removed.

FIG. 1 is a diagram of a conventional magnetic recording hard disk drive. The disk drive includes a magnetic recording disk 12 and a rotary voice coil motor (VCM) actuator 14 supported on a disk drive housing or base 16. The disk 12 has a magnetic recording layer with a plurality of concentric data tracks. The disk 12 is rotated in direction 15 about rotational axis 13 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. The head carrier has an end face or trailing surface 25 generally perpendicular to the circumferential track direction and side surfaces 26 generally parallel to the track direction. A magnetic recording read/write head 24 that typically includes an inductive write head and a magnetoresistive read head is formed on the end face or trailing surface 25 of slider 22. The flexure 23 and suspension 20 enable the slider to "pitch" and "roll" on an air-bearing generated by the rotating disk 12. As the disk 12 rotates the actuator 14 can be rotated to move the read/write head 25 in a generally radial direction across the tracks so that different concentric data tracks on disk 12 can be accessed for reading or writing of data. Typically, there are multiple disks stacked on a hub that is rotated by the spindle motor, with a separate slider and read/write head associated with each disk surface.

Figure 2A:
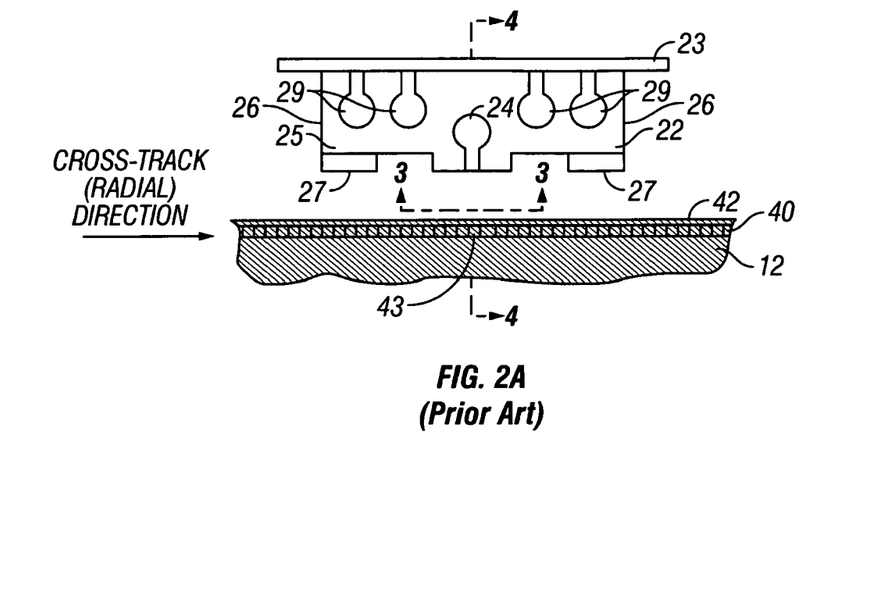
FIG. 2A is an enlarged end view of the slider and a section of the disk taken in the direction 2-2 in FIG. 1.

FIG. 2A is an enlarged end view of the disk drive head assembly and a section of the disk 12 taken in the direction 2-2 in FIG. 1. The head assembly includes the slider 22 and the read/write head 24 formed on the slider's trailing surface 25. The slider 22 is attached to flexure 23 and has a disk-facing surface 27 and an end face 25 generally perpendicular to the disk-facing surface 27 and generally parallel to the radial or cross-track direction. The disk-facing surface 27 of slider 22 is the air-bearing surface (ABS) and the end face 25 is the trailing surface. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25.

As shown in FIG. 2A, the disk 12 has a magnetic recording layer 40 and a protective overcoat 42. The magnetic recording layer 40 may be a continuous layer of magnetic recording material, such as a sputter-deposited cobalt (Co) alloy film, like in conventional commercially-available magnetic recording disks, sometimes called "continuous" media. If the disk 12 is continuous media, then the inductive write head forms data tracks in the circumferential direction (into the paper in FIG. 2A) when write current through the write head generates magnetic fields as the disk 12 rotates. The cross-sections of a plurality of concentric data tracks are shown aligned in the radial direction in FIG. 2A, with the data track directly below read/write head 24 being identified as track 43.

Figure 2B:
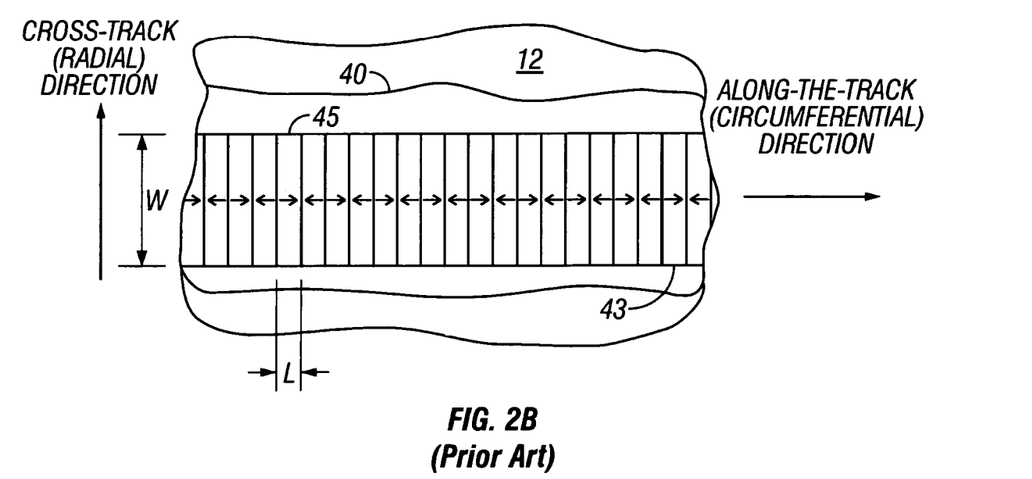
FIG. 2B is a top view of the magnetic recording disk in the prior art disk drive showing a data track on a continuous magnetic recording layer with data bits having a high bit aspect ratio (BAR).

FIG. 2B is a top view of disk 12 showing a portion of the magnetic recording layer 40 with data track 43. Each of the data tracks has magnetized regions or magnetizations (represented by the arrows) in the plane of layer 40 and oriented in the circumferential or along-the-track direction. The recording layer 40 of magnetic material is called a continuous magnetic layer because the data tracks are not physically separated from one another and are not pre-formed in the layer 40, but are formed when the write fields from the write head create the magnetizations in the continuous magnetic layer. In FIG. 2B, each magnetized region is represented as the smallest single "bit" that is capable of being created by a single pulse from the write head, such as typical bit 45. In actuality many of the magnetizations represented by the arrows would be longer than a single bit size because the magnetization directions are not switched until there is a change from a 1 to a 0, or vice versa, in the data being recorded. While the magnetized regions are referred to as bits or bit cells, it is the transitions between adjacent magnetized regions along the track that are detected as data by the read head. In FIG. 2B, the bits are depicted as being magnetized in the plane of recording layer 40, and thus the disk 12 is a horizontal or longitudinal magnetic recording disk. However, the recording disk may be a perpendicular magnetic recording disk, in which case the magnetizations of the bits would be perpendicular to the plane of the recording layer 40.

As shown in FIG. 2B, each bit, such as typical bit 45, has a cross-track width W and an along-the-track length L, so that an individual bit can be considered to have a bit aspect ratio (BAR) of approximately W/L. However, the BAR is more accurately determined as the ratio of linear bit density, i.e., the number of bits per inch (BPI) in the circumferential or along-the-track direction, to the track density, i.e., the number of tracks per inch (TPI) in the radial or cross-track direction. The conventional approach to increasing the overall data density of a disk has focused more on increasing the BPI, so that conventional disks have a relatively high BAR, e.g., about 5 or more.

Figure 2C:
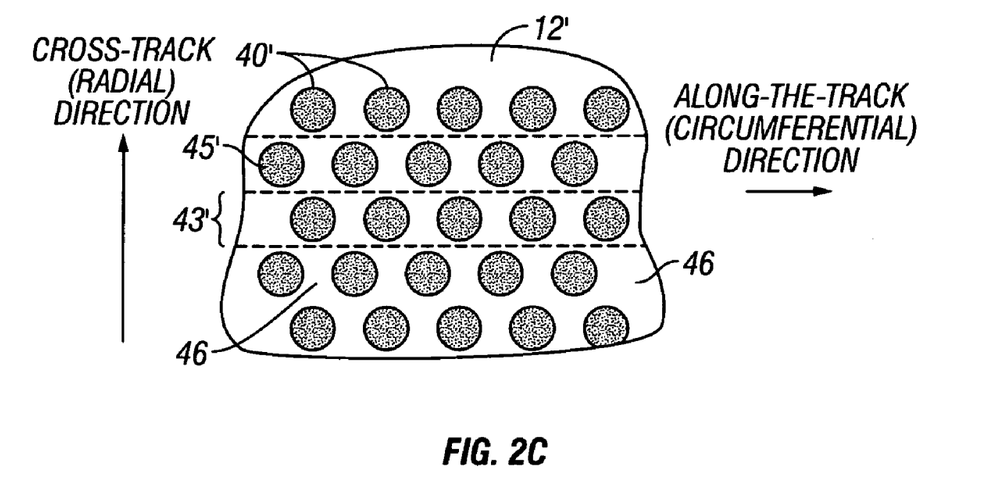
FIG. 2C is a top view of a prior art magnetic recording disk showing a data track on a patterned magnetic recording layer with data bits having a low BAR.

While conventional magnetic recording disk drives use continuous media, as described above, disk drives have been proposed that use "patterned" media. In patterned media, the magnetic material in the recording layer on the disk is patterned into small isolated blocks or islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks. U.S. Pat. No. 5,820,769 is representative of various types of patterned media and their methods of fabrication. The term "nonmagnetic" means that the regions between the data blocks are formed of a nonferromagnetic material, such as a dielectric, or a material that has no substantial remanent moment in the absence of an applied magnetic field. The nonmagnetic regions may also be the absence of magnetic material, such as grooves or troughs in the magnetic recording layer or disk substrate. FIG. 2C is a top view of a disk 12' with a magnetic recording layer 40' that is patterned into data blocks or bits of magnetic material, such as typical bit 45', separated by nonmagnetic regions 46. In the example of FIG. 2C the bits are circularly shaped, but the bits can have other shapes. In FIG. 2C, the disk is a low-BAR disk because the spacing of the bits along-the-track and in the cross-track direction results in a BAR of around 1. The patterned bits may be magnetized in-the-plane of recording layer 40' for horizontal recording, and perpendicular to the plane of recording layer 40' for perpendicular recording.

Figure 3:
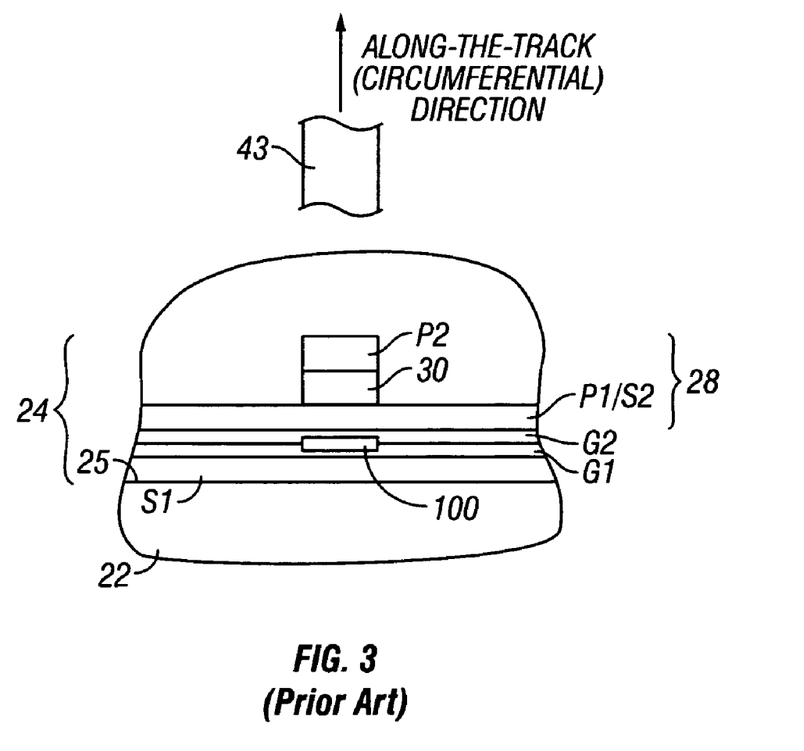
FIG. 3 is a view in the direction 3-3 of FIG. 2A and shows the ends of a conventional read/write head as viewed from the disk in the prior art disk drive.

FIG. 3 is a view in the direction 3-3 of FIG. 2A and shows the ends of read/write head 24 as viewed from the disk 12. The read/write head 24 is a series of thin films deposited and lithographically patterned on the trailing surface 25 of slider 22. The write head 28 includes magnetic write poles P1/S2 and P1 separated by a write gap 30. When write current is directed to the write head 28 a magnetic field is generated across the write gap 30 in a direction along the track 43. The magnetoresistive sensor or read head 100 is located between two insulating gap layers G1, G2 that are typically formed of alumina ($Al_2O_3$). Gap layers G1, G2 are located between magnetic shields S1 and P1/S2, with P1/S2 also serving as the first write pole for the write head. Because shield S2 also serves as the pole P1, this type of read/write head 24 is known as a "merged" head. If S2 and P1 are separate layers the read/write head is known as a "piggyback" head. The write poles are typically formed of a plated NiFe or CoFe alloy. The shields are typically formed of permalloy (NiFe) or sendust (FeAlSi). When the read head 100 is detecting a magnetic transition from the data track 43 the shields S1, S2 prevent magnetic flux from neighboring transitions in the data track from reaching the read head.

Figure 4:
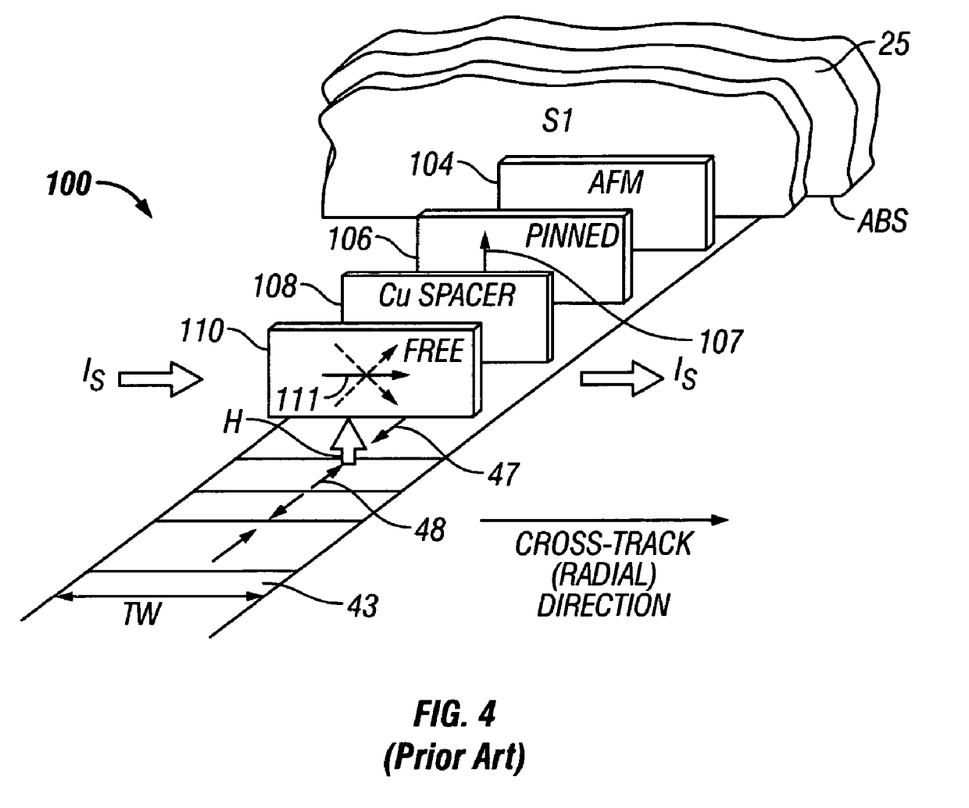
FIG. 4 is a perspective exploded view of a conventional magnetoresistive read head and a data track for showing schematically the operation of the read head to detect magnetic fields from the disk in the prior art disk drive.

FIG. 4 is a perspective view of a conventional giant magnetoresistance (GMR) spin-valve read head 100 showing the stack of layers making up the head and the operation of the head to detect magnetic fields from the disk. The layers are formed on shield S1 that is formed on the end face 25 of the slider, with end face 25 being orthogonal to the ABS and generally parallel to the cross-track direction. The head 100 includes a pinned ferromagnetic layer 106 having a fixed or pinned magnetic moment or magnetization direction 107 oriented perpendicular to the disk, a sensing or "free" ferromagnetic layer 110 having a magnetic moment or magnetization direction 111 that can rotate in the plane of free layer 110 in response to transverse external magnetic fields from the disk, and a nonmagnetic electrically-conductive spacer layer 108 between the pinned layer 106 and free layer 110. The pinned layer 106 is exchange-coupled with an antiferromagnetic (AFM) layer 104. Thus the magnetization direction 107 of pinned layer 106 is fixed and will not rotate in the presence of an external magnetic field in the range of interest, i.e., magnetic fields from recorded data on the disk. The width of the free layer 110 in the cross-track direction generally defines the data track width (TW). With a sense current $I_S$ applied generally in the planes of the free layer 110 and pinned layer 106 from electrical leads (not shown) connected at the edges of the read head, the rotation of the free-layer magnetization 111 relative to the pinned-layer magnetization 107, due to the magnetic fields from the disk, is detectable as a change in electrical resistance. The free layer 110 has its magnetization direction 111 oriented generally parallel to the ABS and the surface of the disk above the data track 43 in the absence of an applied magnetic field. The two adjacent magnetic transitions 47, 48 in the plane of the magnetic recording layer and along-the-track create a magnetic field H out of the plane of the disk and generally orthogonal to free-layer magnetization direction 111. This field H will cause the magnetization direction 111 to rotate in the plane of free layer 110 either "up" or "down" from the disk, depending on the direction of field H, as shown by the dashed arrows.

The read head 100 in FIG. 4 is a current-in-the plane (CIP) spin valve (SV) read head because the sense current $I_S$ is directed in the planes of the free and pinned layers. However, the read head 100 may be a current-perpendicular-to-the-plane (CPP) read head that has the sense current directed $I_s$ directed generally perpendicularly through the planes of the free and pinned layers. The read head 100 described above is a GMR read head because the nonmagnetic spacer layer 108 is electrically conductive. However, the read head may also be a well-known magnetic tunnel junction (MTJ) magnetoresistive read head, in which case the spacer layer is an electrically-insulating tunnel barrier, typically alumina. An MTJ read head is also a CPP read head.

Figure 5A:
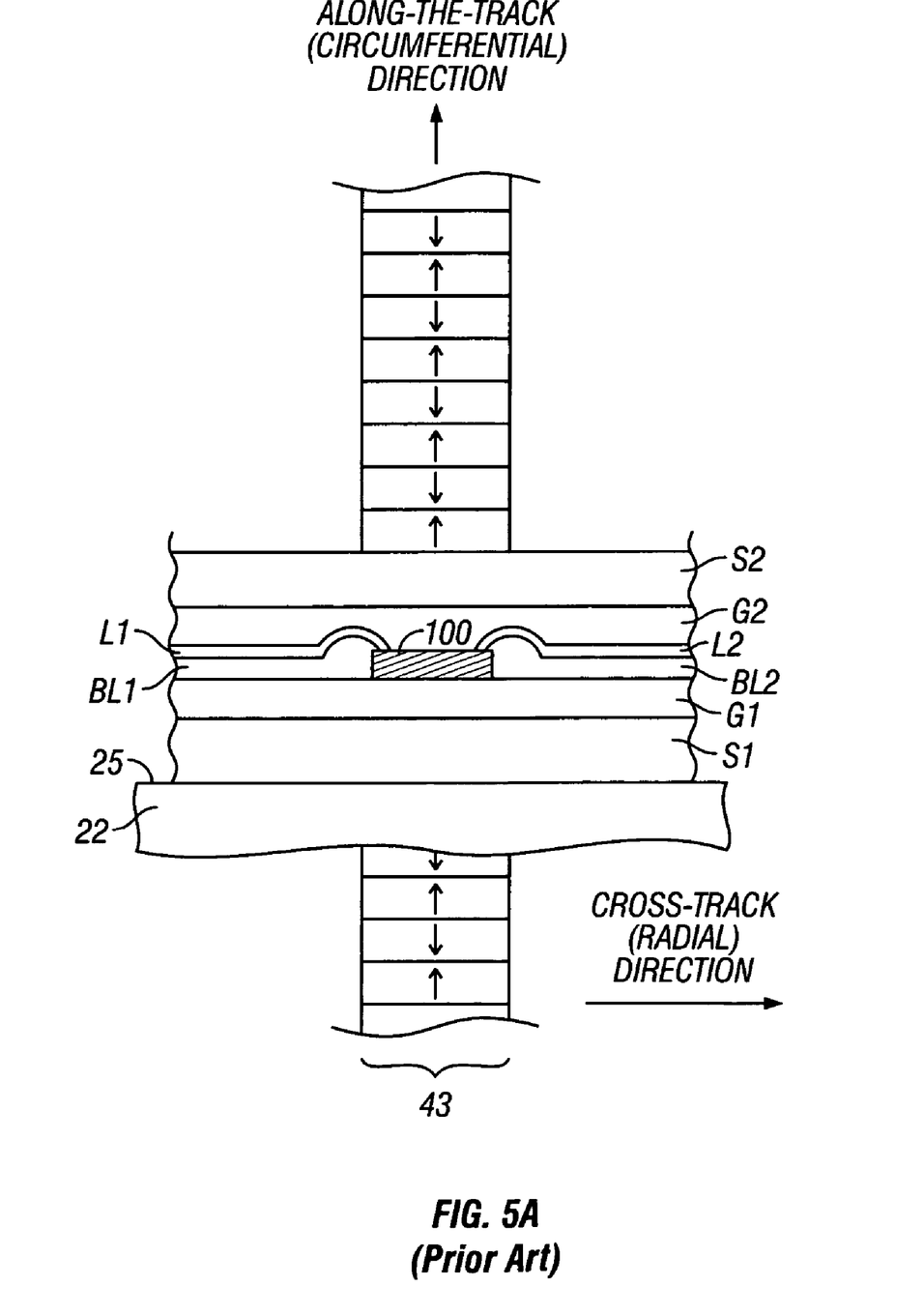
FIG. 5A depicts a current-in-the-plane (CIP) magnetoresistive read head superimposed on a continuous media data track with high BAR according to the prior art.

FIG. 5A depicts a CIP magnetoresistive read head superimposed on data track 43. The read head 100 is located between electrically insulating gap layers G1, G2, which are located between shields S1, S2. The magnetization direction of the sensing layer in head 100 is biased by ferromagnetic biasing layers BL1, BL2, and electrical connection is made to the head 100 by electrical leads L1, L2 that enable sense current to be directed parallel to the planes of the layers in the head 100.

Figure 5B:
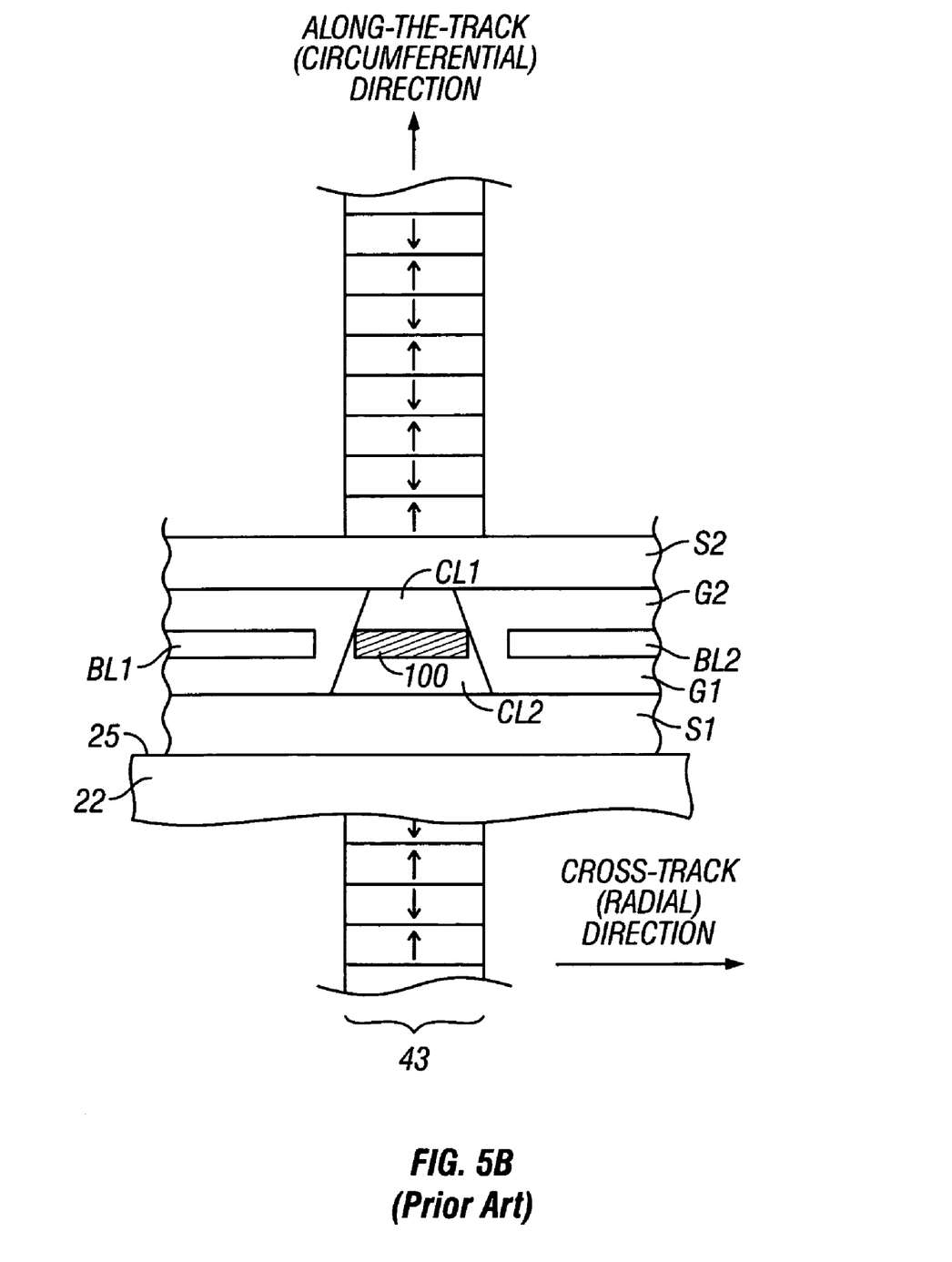
FIG. 5B depicts a current-perpendicular-to-the-plane (CPP) magnetoresistive read head superimposed on a continuous media data track with high BAR according to the prior art.

FIG. 5B depicts a CPP magnetoresistive read head superimposed on data track 43. The read head 100 is located between electrically conductive layers CL1, CL2, which are located between shields S1, S2. The magnetization direction of the sensing layer in head 100 is biased by ferromagnetic biasing layers BL1, BL2, and electrical connection is made to the head 100 through the shields S1, S2 and layers CL1, CL2 that enable sense current to be directed perpendicular to the planes of the layers in the head 100.

The Invention

Thin film read heads, like those depicted in FIGS. 5A-5B, generally have an asymmetric spatial resolution, in particular a high spatial resolution in the transverse direction perpendicular to the substrate, i.e., end face 25 of the head carrier on which they are formed, and a lower spatial resolution in the direction parallel to the substrate. This asymmetric spatial resolution is because the transverse resolution is controlled by the gap spacing between the magnetic shields, while the parallel resolution is controlled by the width of the sensing layer, which is determined by lithography. This inherent asymmetry, coupled with the challenges of implementing track-following servo systems for very narrow tracks, motivates magnetic recording systems designers to choose large BAR values, typically greater than 5.

More recently the superparamagnetic effect has begun to limit continued increases in linear bit density. This well-known effect dictates that continued downward scaling of media grain sizes (needed to support increased linear bit density at an acceptable media transition noise level) results in loss of thermal stability of the recording medium, meaning that the data can erase itself in less than the expected lifetime of the recording medium. To circumvent this problem, the track density can be scaled faster than linear bit density, leading to a lower BAR. Ultimately, however, patterned media will be required to achieve areal data densities on the order of 300 Gbit/in$^2$. Achieving this data density with a BAR significantly greater than 1 will severely strain lithography technologies, which also motivates a low BAR.

However, a disk with a low BAR makes the conventional orientation of the read head unfavorable because of its low cross-track resolution. This is because conventional magnetic recording disk drives use a partial-response (PR) data detection and decoding scheme that can account for inter-symbol interference and successfully decode data in a case where the along-the-track resolution of the head is significantly lower than the linear bit spacing. The resolving power of the read head is commonly measured as the pulse width at half maximum of the head response to a very small magnetic feature on the disk (PW50). The ratio of the PW50 to the bit length is in the range of about 2 to 4 for conventional PR data channels. On the other hand, the PR channel can not easily correct for signals from adjacent data tracks, so that any significant response from a neighboring data track results in an unacceptably high error rate. Thus the cross-track resolution of the read head needs to be high enough so that the response from neighboring data tracks is at least 20 dB down. Thus, a low BAR (on the order of 1) dictates a read head with a cross-track resolution at or smaller than the along-the-track bit spacing, while the along-the-track resolution is typically 2 to 4 times greater than the linear bit spacing. From the above reasoning, the crossover point between choosing a read head with superior along-the-track resolution over one with superior cross-track resolution occurs at a BAR of around 3.

This invention is a magnetic recording disk drive with the plane of the substrate surface on which the read head and its shields are formed oriented parallel to the along-the-track direction. This is shown schematically in FIG. 6 for a disk drive with a disk 12' and a head carrier or slider 22 supported by suspension 20. The disk 12' is a disk with a BAR less than about 3 and having a plurality of concentric data tracks, such as typical low-BAR data track 43'. The read head 100 with shields S1, S2 (not shown) and write head 28' are formed on a side surface 26 of the slider 22. The side surface 26 of slider 22 is generally orthogonal to both the disk-facing surface 27 and the end face 25 and generally parallel to the data track 43' being read.

Figure 6:
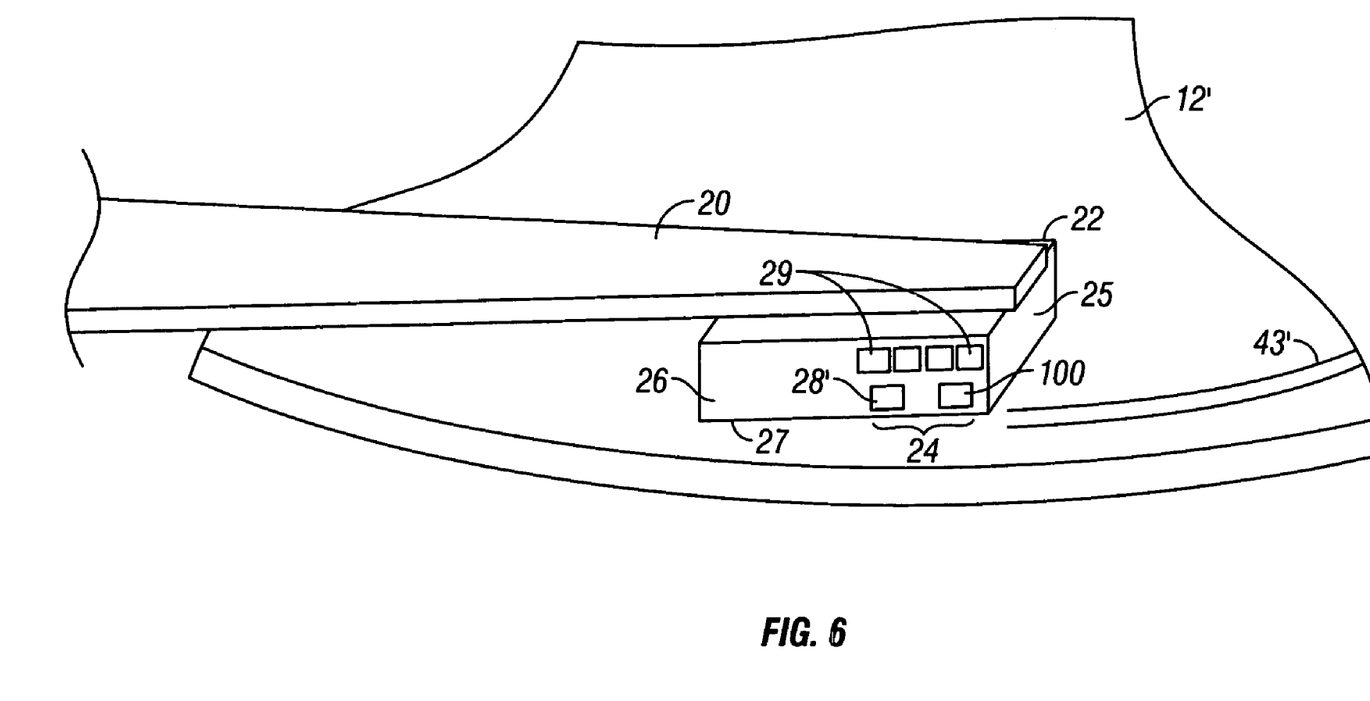
FIG. 6 is a schematic of a portion of the disk drive of the present invention showing read head on a side surface of the slider oriented parallel to the along-the-track direction.
Figure 7:
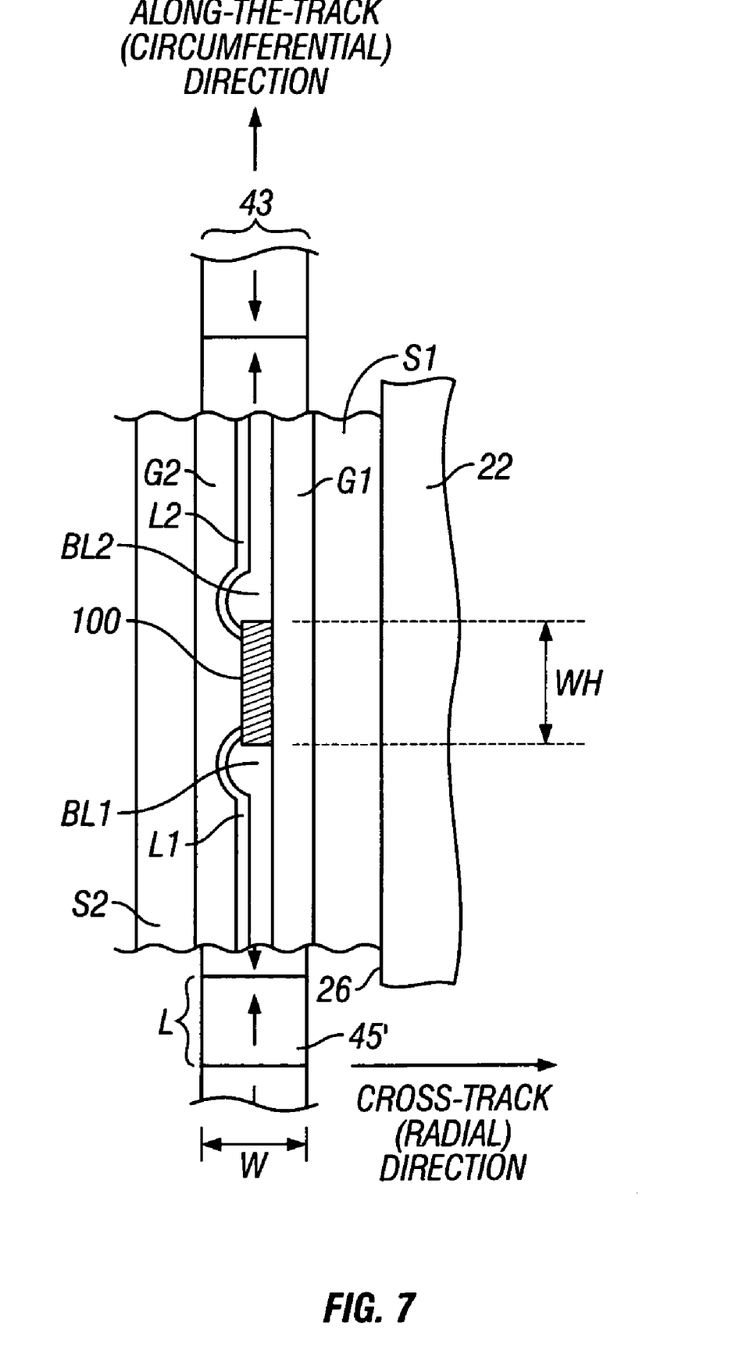
FIG. 7 depicts the read head of FIG. 6 as a CIP magnetoresistive read head superimposed on a data track with low BAR.

FIG. 7 depicts the read head 100 of FIG. 6 as a CIP magnetoresistive read head superimposed on the low-BAR data track 43'. The read head 100 is located between electrically insulating gap layers G1, G2, which are located between shields S1, S2. The first shield S1 is formed on the side surface 26 of slider 22. The magnetization direction of the sensing layer in head 100 is generally parallel to the data track 43' and is biased by ferromagnetic biasing layers BL1, BL2. Electrical connection is made to the head 100 by electrical leads L1, L2 that enable sense current to be directed parallel to the planes of the layers in the head 100. The data track 43' is shown with single bits, such as typical bit 45', having approximately equal W and L dimensions, which would result for a disk with a BAR of about 1. The shields S1, S2 prevent magnetic flux from data tracks neighboring data track 43' from reaching the read head 100.

The bits in data track 43' of FIG. 7 may be magnetized regions of continuous media, like that shown in FIG. 5A but with a low BAR, or discrete blocks of patterned media, as shown in FIG. 2C. Also, the disk may be one with a perpendicular magnetic recording layer with the bits magnetized perpendicular to the recording layer, rather than one with a horizontal recording layer with the bits magnetized in the plane of the recording layer, like that depicted in FIG. 7. While a CIP read head is depicted in FIG. 7, the invention is fully applicable with a CPP read head located between the shields S1, S2 on side surface 26 of the slider 22.

As shown in FIG. 7, the read head 100 has a width WH parallel to the surface 26 on which it is formed and parallel to the data track 43'. For patterned media to be used with a conventional read head (where the surface on which the head is formed is perpendicular to the along-the-track direction, like that shown in FIG. 5A) the width WH is required to be less than T, where T is the cross-track pitch of data tracks on the disk. This is because if WH is greater than T the read head will detect an excessive amount of magnetic flux from data on adjacent data tracks. However, when used with patterned media the read head of the present invention can have a WH greater than T, which is roughly equal to the down-track pitch of islands along a track for BAR approximately equal to 1. This is because signals deriving from multiple down-track data bits can be processed simultaneously in the read channel and this information used to extract the bit data. Because the read head can be made wider it is easier to form and lithographically pattern on the substrate surface.

Typical dimensions for the read head and recording medium for a disk drive using patterned media and designed for an areal density of 500 Gbits/in$^2$ with BAR=1 are as follows: track pitch=36 nm, bit pitch=36 nm, read head width WH=80 nm, read head height=50 nm, shield-to-shield spacing or gap=50 nm, head-medium spacing (bottom of head to top of medium)=10 nm, patterned recording medium island diameter=25 nm, and patterned recording medium island thickness=10 nm.

The advantages of the present invention have been demonstrated by computer modeling. In the model, the media was perpendicular media with a patterned perpendicular recording layer above a soft magnetic underlayer that provides a flux return path. The patterned media was like that shown in FIG. 2C, with each bit having perpendicular magnetization. The diameter of each bit was 23 nm, the along-the track period of the bits was 38.6 nm and the cross-track period was 33.4 nm, resulting in a BAR=0.87.

The read head had a width WH of 50 nm and a thickness of 3 nm. The gap between the two shields was 50 nm. With this media and read head, data was read in the conventional manner, i.e., with the head carrier oriented such that the substrate surface supporting the head was oriented parallel to the cross-track direction (like in FIG. 5A), and compared with data read according to the present invention, i.e., with the head carrier oriented such that the substrate surface was parallel to the along-the-track direction (like in FIG. 7). The present invention provided substantially better cross-track rejection. In particular, the head was capable of rejecting 95% of the signal amplitude from an adjacent track only 66 nm away from the center of the head, whereas a head with the conventional orientation requires the adjacent track to be 119 nm away from the center of the head to achieve the same level of adjacent track rejection.

Computer modeling has further shown that the capability for adjacent track rejection of a head oriented with the substrate surface parallel to the along-the-track direction is not particularly sensitive to the spacing or gap between the shields. This compares very favorably to a conventionally-oriented head, for which the lithographically-defined width of the read sensor strongly influences adjacent track rejection capability, placing difficult tolerance requirements on the lithographic patterning step. Thus an additional advantage of this invention is that the shield-to-shield spacing or gap can be larger than T, the cross-track pitch of data tracks on the disk. This is shown in FIG. 7 where the S1-S2 spacing is depicted as being greater than W, the width of the data track. A small shield-to-shield gap is difficult to achieve due to the need for insulation layers, relatively thick antiferromagnetic layers, and in-stack biasing layers.

Furthermore, modeling shows that skew angles as high as 15 degrees between the plane of the head substrate and the tangent of the data track on the disk do not have a significantly harmful effect on adjacent track rejection, as long as the read head width is less than about 2 times the bit pitch of the data track on the disk.

Figure 8A:
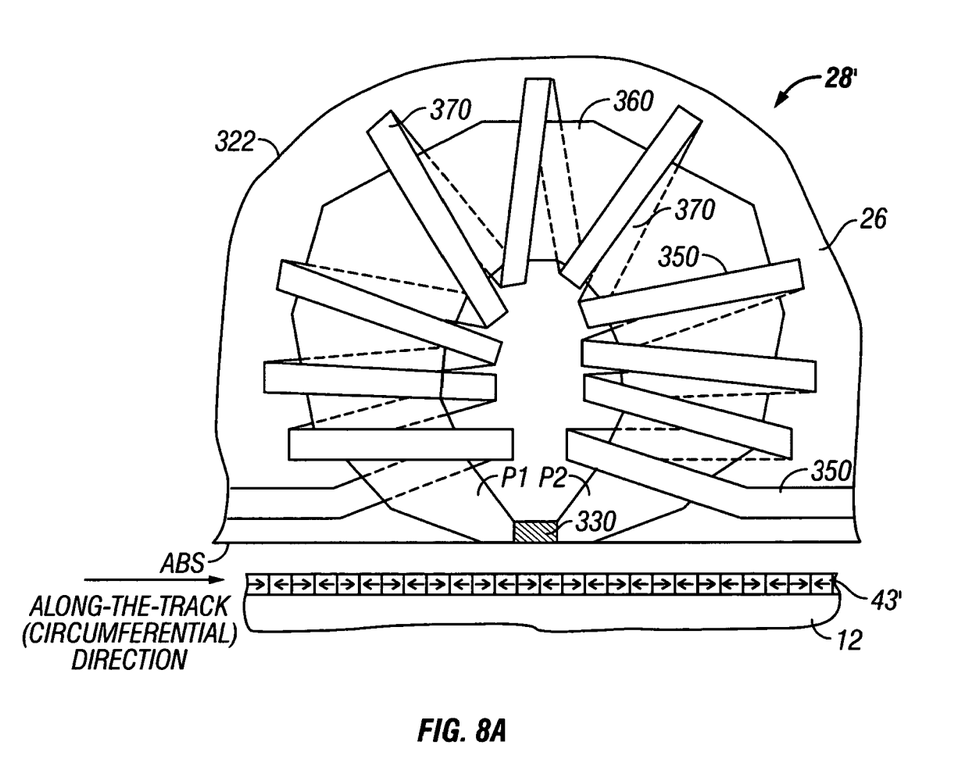
FIG. 8A is a view facing the side surface of the slider of the present invention and showing a write head on the side surface and a section of the disk with a data track.
Figure 8B:
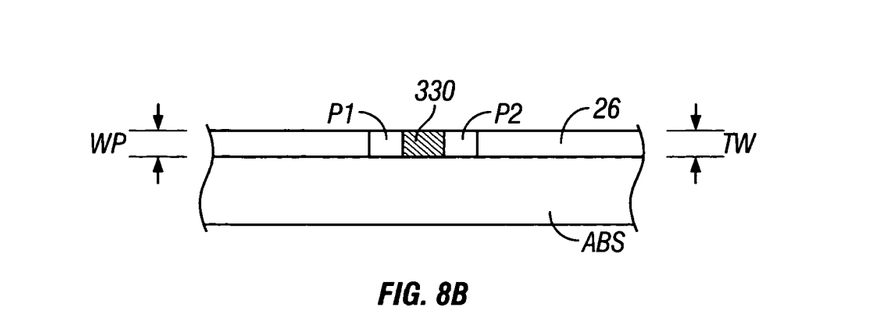
FIG. 8B is a view facing the disk-facing surface of the slider and showing the pole tips of the write head of FIG. 8A.

As shown schematically in FIG. 6, a write head 28' is formed on the side surface 26 of slider 22 next to read head 100. A write head for use with the disk drive of the present invention is shown in FIGS. 8A-8B. The write head 28' includes a first patterned copper layer 350, a patterned yoke 360, and a second patterned copper layer 370; all formed by conventional lithographic patterning and deposition processes. Each copper layer 350, 370 includes a set of coil segments that are connected at their ends to form a complete coil that wraps around or surrounds the intermediate yoke 360, so that when write current is generated through the coil a magnetic field is generated across the write gap 330 by the coplanar write poles P1, P2. As shown in FIG. 8A, the write poles P1, P2 and the write gap 330 lie in substantially the same plane, which is parallel to the slider's side surface 26 and thus parallel to the along-the-track direction. A magnetic field across the write gap 330 is oriented along the track direction and creates the magnetizations in the data tracks. A portion of data track 43' is depicted in FIG. 8A to show the relationship of the poles P1, P2 and write gap 330 to a data track. FIG. 8B shows the write poles and write gap as viewed from the ABS. The thickness or width ($W_P$) of the coplanar write poles P1, P2 determines the trackwidth (TW) for continuous media. The strength of the write field applied to the recording layer increases with increasing thickness of the write poles.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive having a disk and a read head for reading data recorded on the disk, the disk drive comprising:
   a rotatable disk comprising a substrate and a magnetic recording layer on the substrate and patterned into a plurality of generally concentric data tracks having discrete data bits of magnetic material separated by nonmagnetic regions, the tracks having a track pitch T;
   a carrier for the read head and having a disk-facing surface and a side surface substantially orthogonal to the disk-facing surface;
   a first magnetic shield on said side surface;
   a read head on the first shield and comprising a sensing layer having a width WH parallel to the disk-facing surface, and wherein WH is greater than T;
   a second magnetic shield on the read head; and
   an actuator connected to the carrier for positioning the read head to selected data tracks, the actuator supporting the carrier with the read head's sensing layer and its width WH generally parallel to the data track being read.

2. The disk drive of claim 1 wherein the discrete data bits contain magnetic material magnetizable in the plane of the recording layer.

3. The disk drive of claim 1 wherein the discrete data bits contain magnetic material magnetizable perpendicular to the plane of the recording layer.

4. The disk drive of claim 1 wherein the spacing between the shields is greater than T.

5. The disk drive of claim 1 wherein the ratio of the bit density along the data tracks to the track density in the radial direction is less than about 3.

6. The disk drive of claim 1 wherein the read head is a magnetoresistive read head and the sensing layer is a free ferromagnetic layer having an in-plane magnetization direction oriented substantially parallel to the head carrier's disk-facing surface in the absence of an external magnetic field and substantially free to rotate in the presence of magnetic fields from the data tracks, the read head further comprising:
   a pinned ferromagnetic layer having an in-plane magnetization direction oriented substantially perpendicular to the head carrier's disk-facing surface; and
   a nonmagnetic spacer layer between the free and pinned layers;
wherein the free layer, spacer layer and pinned layer are located between said first and second shields.

7. The disk drive of claim 6 wherein the magnetoresistive read head is a current-in-the-plane (CIP) read head.

8. The disk drive of claim 6 wherein the magnetoresistive read head is a current-perpendicular-to-the-plane (CPP) read head.

9. The disk drive of claim 1 further comprising an inductive write head formed on said side surface.

10. A magnetic recording disk drive comprising:
   a rotatable disk comprising a substrate and a magnetic recording layer on the substrate and patterned into a plurality of generally concentric data tracks having discrete data bits of magnetic material separated by nonmagnetic regions, the tracks having a track pitch T;

a carrier having a disk-facing surface and a side surface substantially orthogonal to the disk-facing surface;

a pair of magnetic shields on said side surface and spaced apart in a direction perpendicular to said side surface;

a magnetoresistive read head between the shields for detecting the data bits on the disk and having a width WH parallel to the disk-facing surface, wherein WH is greater than T;

an inductive write head on said side surface for magnetizing the data bits; and an actuator connected to the carrier for moving the carrier generally radially across the disk, the actuator supporting the carrier with WH generally parallel to the data tracks.

11. The disk drive of claim 10 wherein the data bits are magnetizable in the plane of the recording layer.

12. The disk drive of claim 10 wherein the data bits are magnetizable perpendicular to the plane of the recording layer.

13. The disk drive of claim 10 wherein the ratio of the bit density along the data tracks to the track density in the radial direction is less than about 3.

14. The disk drive of claim 10 wherein the read head comprises:

a free ferromagnetic layer having an in-plane magnetization direction oriented substantially parallel to the head carrier's disk-facing surface in the absence of an external magnetic field and substantially free to rotate in the presence of magnetic fields from the data bits;

a pinned ferromagnetic layer having an in-plane magnetization direction oriented substantially perpendicular to the head carrier's disk-facing surface; and a nonmagnetic spacer layer between the free and pinned layers.

15. The disk drive of claim 14 wherein the head is a current-in-the-plane (CIP) read head.

16. The disk drive of claim 14 wherein the read head is a current-perpendicular-to-the-plane (CPP) read head.

17. A magnetic recording disk drive having a disk and a magnetoresistive read head for reading data recorded on the disk, the disk drive comprising:

a rotatable disk comprising a substrate and a magnetic recording layer on the substrate and patterned into a plurality of generally concentric data tracks having discrete data bits of magnetic material separated by nonmagnetic regions, wherein the ratio of the bit density along the data tracks to the track density in the radial direction is less than about 3;

a carrier for the magnetoresistive read head and having a disk-facing surface and a side surface substantially orthogonal to the disk-facing surface;

an actuator connected to the carrier for positioning the magnetoresistive read head to selected data tracks, the actuator supporting the carrier with said side surface oriented substantially parallel to the data track being read;

a first magnetic shield layer on and substantially parallel to said carrier side surface;

a magnetoresistive read head on the first shield layer and comprising a free ferromagnetic layer substantially parallel to said carrier side surface for detecting data bits in the data track being read and having an in-plane magnetization direction oriented substantially parallel to said carrier disk-facing surface in the absence of an external magnetic field and substantially free to rotate in the presence of magnetic fields from the data bits in the data track being read, a pinned ferromagnetic layer having an in-plane magnetization direction oriented substantially perpendicular to said carrier disk-facing surface, and a nonmagnetic spacer layer between the free and pinned layers; and a second magnetic shield layer on the magnetoresistive read head and substantially parallel to said carrier side surface, the first and second magnetic shield layers substantially preventing magnetic flux from data bits in tracks other than the data track being read from reaching the free ferromagnetic layer.

18. The disk drive of claim 17 wherein the data bits are magnetizable perpendicular to the plane of the recording layer.

19. The disk drive of claim 17 wherein the head is a current-in-the-plane (CIP) read head.

20. The disk drive of claim 17 wherein the read head is a current-perpendicular-to-the-plane (CPP) read head.

* * * * *